No. 628,705. Patented July 11, 1899.
D. P. GOLDSMITH & B. F. MARTYN.
COFFEE POT.
(Application filed Mar. 14, 1899.)
(No Model.)
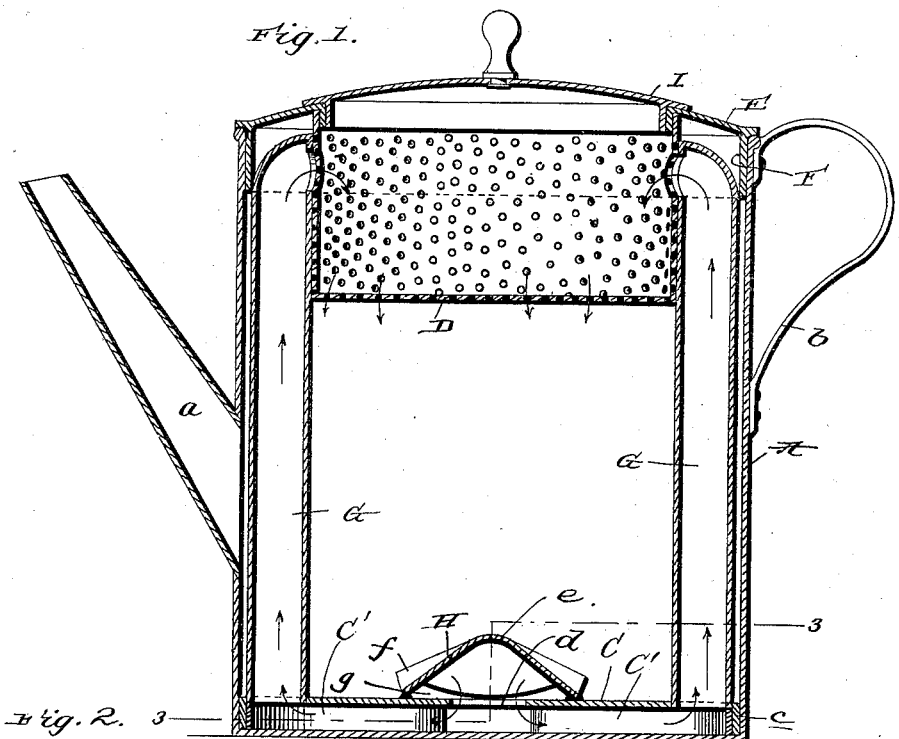
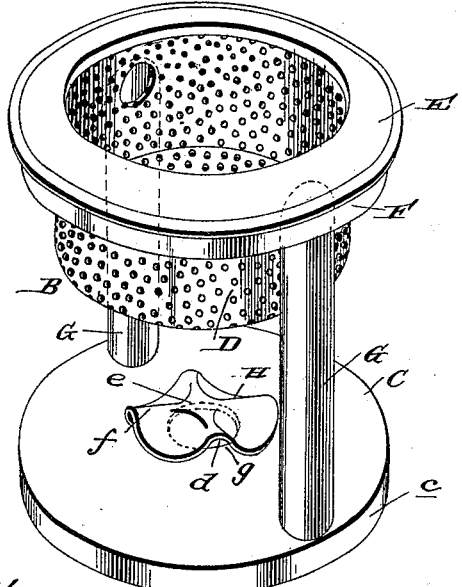
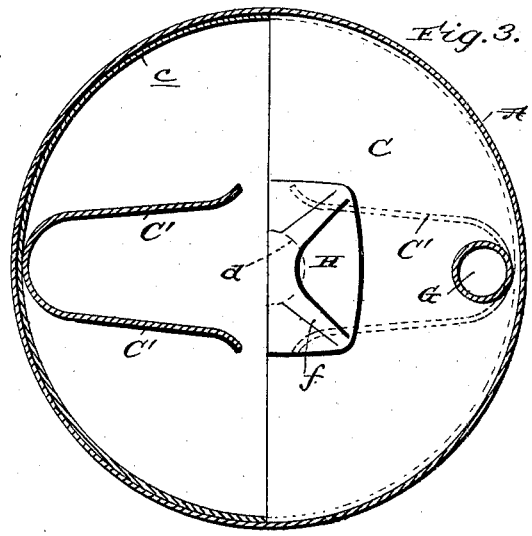

UNITED STATES PATENT OFFICE.

DUVAL P. GOLDSMITH AND BENJAMIN F. MARTYN, OF WARRENTON, VIRGINIA.

COFFEE-POT.

SPECIFICATION forming part of Letters Patent No. 628,705, dated July 11, 1899.

Application filed March 14, 1899. Serial No. 709,058. (No model.)

*To all whom it may concern:*

Be it known that we, DUVAL P. GOLDSMITH and BENJAMIN F. MARTYN, citizens of the United States, residing at Warrenton, in the county of Fauquier and State of Virginia, have invented new and useful Improvements in Coffee-Pots, of which the following is a specification.

Our invention relates to that class of coffee-pots which are constructed with a view of making drip-coffee; and it consists in the peculiar and advantageous construction hereinafter described, and particularly pointed out in the claims appended.

In the accompanying drawings, Figure 1 is a diametrical section of a coffee-pot provided with our improvements. Fig. 2 is a perspective view of the improved apparatus removed from the body of the pot. Fig. 3 is a transverse section taken on line 3 3 of Fig. 1.

In the said drawings similar letters designate corresponding parts in all of the views, referring to which—

A is the body of the pot, which is provided with a spout $a$ and handle $b$ and is otherwise of the ordinary construction, and B is our improved apparatus, which is placed in but not fastened to the body A, and is therefore adapted to be readily removed to permit of it, as well as the said body A, being thoroughly cleansed when necessary. The said apparatus A is made up of a base C, which is provided with a depending marginal flange $c$ and a central opening $d$ and is of a diameter to snugly occupy the body A, a foraminated coffee receptacle or percolator D, which is disposed above the base C and is provided at its upper edge with an annular imperforate rim E, designed to bear upon the body A and having a depending flange F, adapted to rest within the said body, and one or more (preferably two opposite) upright tubes G, which are interposed between the base C and the receptacle D and serve to support the said receptacle and also to convey hot water and steam to the same. At its under side the base C is provided with two U-shaped flanges C', which are of a depth corresponding to that of the flange $c$ and are designed to facilitate the passage of water from the center of the space below the base to the lower ends of the tubes G.

Above the opening $d$ of the base C is disposed a deflector H, which has for its purpose to retard the upward passage of steam and hot water through the said opening, and thereby insure the passage of such steam and water up the tubes G and into the receptacle or percolator D. The said deflector H is formed of a piece of sheet metal of a size to entirely cover the opening $d$, and is of the shape shown—that is to say, is raised at its center, as indicated by $e$, inclined downwardly toward its margin, and provided with radial corrugations $f$. The concave corrugations $f$ are connected at the edge of the deflector by solder or other suitable means to the base C, while the convex corrugations form horizontally-disposed passages $g$, the purpose of which is to permit water to pass to and through the opening $d$ into the space below the base C.

As will be readily appreciated, the deflector H when covered with water will prevent the upward passage of steam and hot water through opening $d$ for the purpose before stated, and yet will permit of free passage of water from the space above the space below the base C. It will also be observed that the deflector H as compared with an upwardly-seating valve is very cheap and simple and is advantageous, because it is not liable to be rendered inoperative by sediment. When desired, however, an upwardly-seating valve arranged to control the opening $d$ may be employed in lieu of the deflector H without departing from the scope of our invention.

When our improved apparatus B is placed in the body or pot proper, A, after the manner shown in Fig. 1, the rim E on the receptacle D partially closes the pot, and all that is necessary to complete the closure is a small top I, which is adapted to seat in and on the rim E, as shown. On the other hand, when the apparatus B is removed from the body or pot proper, A, said body or pot proper is left entirely empty and free from obstruction and may therefore be quickly and thoroughly cleansed, as may also the apparatus.

In using our improvements ground coffee is placed in the receptacle D and boiling water is poured over the same, after which the top I is placed on the rim E. The water poured on the coffee in receptacle D will percolate through the coffee and find its way through the passages $g$ and opening $d$ into the space below the base C, and when the pot is placed on a stove will be forced up the tubes G and again caused to percolate through the coffee in receptacle D. This circulation of the hot water and such steam as may be generated will be maintained so long as the pot remains on the stove and the result will be a strong coffee of fine flavor.

Having thus described our invention, what we claim is—

1. In a coffee-pot, the combination with a body or pot proper; of the apparatus arranged therein and comprising a base having a depending marginal flange, a vertically-disposed opening and a depending U-shaped flange C′, a foraminated coffee-receptacle, a tube effecting communication between the space below the base and the interior of the coffee-receptacle and having its lower end opening into the space within the flange C′, and the deflector-plate arranged over the opening in the base; the said deflector-plate being raised at its center and having the concave corrugations connected to the base, and the convex corrugations forming passages $g$, substantially as specified.

2. In a coffee-pot, the combination with the pot or body A; of the apparatus B adapted to be removed from the body and comprising the base C having the marginal flange depending therefrom and a central vertical opening, the foraminated coffee-receptacle D having the imperforate, annular rim E to rest on the upper edge of the body and also having the depending flange as shown, the upright tubes connecting the base with the coffee-receptacle, and the cover I bearing on the rim E and closing the top of the coffee-receptacle, said cover combined with the imperforate rim E of the apparatus B serving to close the top of the pot or body A, substantially as specified.

3. In a coffee-pot, the combination with a body or pot proper; of the apparatus arranged therein and comprising a base having a depending marginal flange and a depending U-shaped flange C′, a foraminated coffee-receptacle, a tube leading from the space below the base and connecting with the interior of the coffee-receptacle and having its lower end opening into the space within said flange C′, substantially as specified.

In testimony whereof we have hereunto set our hands in presence of two subscribing witnesses.

DUVAL P. GOLDSMITH.
BENJ. F. MARTYN.

Witnesses:
JAS. T. O'NEALE,
HIRAM HUFFMAN.